United States Patent [19]

Quentin

[11] 4,054,707
[45] Oct. 18, 1977

[54] SULPHONATED POLYARYL-ETHER-SULPHONES AND MEMBRANES THEREOF

[75] Inventor: Jean-Pierre Quentin, Lyon, France

[73] Assignee: Rhone-Poulenc Industries, Paris, France

[21] Appl. No.: 643,910

[22] Filed: Dec. 23, 1975

[30] Foreign Application Priority Data

Dec. 26, 1974 France .................................. 74.42874

[51] Int. Cl.$^2$ ................................................ C08G 75/23
[52] U.S. Cl. .................. 428/213; 210/23 H; 260/49; 427/244; 427/245; 427/384; 427/391; 428/218; 428/411
[58] Field of Search ............................. 260/49; 428/213

[56] References Cited

U.S. PATENT DOCUMENTS

| | | | |
|---|---|---|---|
| 3,554,972 | 1/1971 | Cornell | 260/49 |
| 3,709,841 | 1/1973 | Quentin | 260/2.2 R |

*Primary Examiner*—Lester L. Lee
*Attorney, Agent, or Firm*—Stevens, Davis, Miller & Mosher

[57] ABSTRACT

Novel sulphonated polyaryl-ether-sulphone resins are described which are particularly suitable for producing semi-permeable membranes, in particular for reverse osmosis. These resins consist essentially of a plurality of units of the formula:

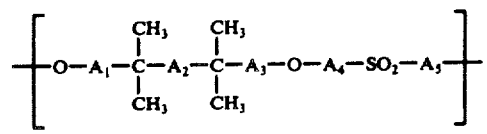

and, optionally, a plurality of units of the formula:

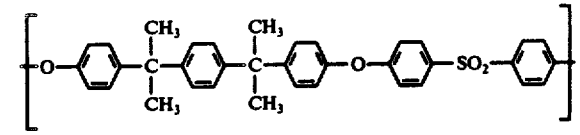

in which $A_1$, $A_2$, $A_3$, $A_4$ and $A_5$ each represents a phenylene radical at least one of which is substituted by an optionally salified sulpho ($-SO_3H$) radical, the relative proportions of units of formula (I) and (II) and the degree of substitution by sulpho radicals being such that the number of sulpho groups is from about 0.1 to about 5 milliequivalents per gram of dry resin.

8 Claims, No Drawings

SULPHONATED POLYARYL-ETHER-SULPHONES AND MEMBRANES THEREOF

The present invention relates to sulphonated polysulphones.

Sulphonated polyaryl-ether-sulphones which can be used as cation exchange resins and as membranes for direct or reverse osmosis have already been described in U.S. Pat. No. 3,709,841. More specifically, sulphonated polyaryl-ether-sulphones have been described which are derived from polysulphones comprising recurring units of the formula:

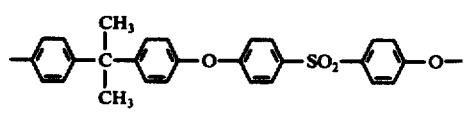

(III)

New sulphonated polyaryl-ether-sulphone which makes it possible to obtain membranes exhibiting improved performance has now been found, according to the present invention. The present invention provides a sulphonated polyaryl-ether-sulphone resin which consists essentially of a plurality of units of formula:

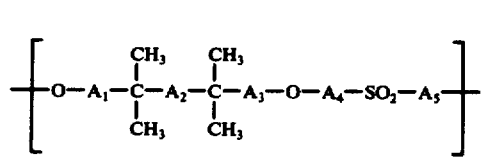

(I)

and, optionally, a plurality of units of the formula:

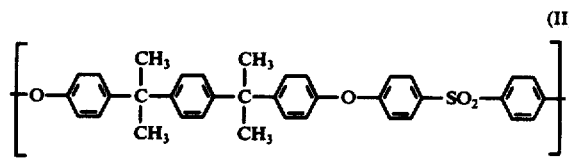

(II)

in which $A_1$, $A_2$, $A_3$, $A_4$ and $A_5$ each represents a benzene ring, at least one of $A_1$, $A_2$, $A_3$, $A_4$ and $A_5$ being substituted by a sulpho ($-SO_3H$) radical which may optionally be salified, the proportion of units of formula (I) and (II) and the proportion of radicals A carrying sulpho radicals being such that the number of sulpho groups is from 0.1 to 5 milliequivalents, and preferably from 0.6 to 2 milliequivalents, per gram of dry resin.

The total number of units (I) and (II) in the sulphonated polysulphone of the invention is generally from 18 to 30, and preferably from 20 to 27. The sulphonated polysulphone of the invention is generally prepared by sulphonation of the nonsulphonated polysulphone which consists essentially of units of formula (II); the preparation of such nonsulphonated polysulphones is described in, for example, British specification No. 1,306,841. The number of units in the polysulphone macromolecules does not vary substantially during the sulphonation reaction.

The sulphonation of the nonsulphonated polysulphone can be carried out in accordance with the procedures described in, for example, U.S. Pat. No. 3,709,841. Suitable sulphonating reagents include chlorosulphonic acid ($ClSO_3H$), sometimes called chlorosulphuric acid, which is the preferred sulphonating agent. However, it is also possible to use, for example, sulphur trioxide and its addition products with Lewis bases containing oxygen as the electron donor atom; sulphuric acid and fuming sulphuric acid can also be used. The sulphonation reaction is generally carried out at $-50°$ to $+80°$ C, preferably at $-10°$ to $+35°$ C, in solution in a solvent for the polyaryl-ether-sulphone which is inert as regards the sulphonation reaction. Halogenated hydrocarbons, especially methylene chloride, chloroform, 1,2-dichloro-ethane and 1,1,2,2-tetrachloro-ethane are suitable such solvents.

The amount of sulphonating agent employed is generally such that the ratio of the number of sulphur atoms of the sulphonating agent to the number of sulphur atoms of the nonsulphonated polyaryl-ether-sulphone is from 0.3 to 6, and preferably from 1.2 to 4. The exact number of sulpho groups which can be fixed to the nonsulphonated polyaryl-ether can of course be altered by adjusting the sulphonation conditions and, in particular, the temperature, the duration of the reaction and the concentration of the reagents. The sulphonated polyaryl-ether-sulphone produced can be isolated in accordance with the method described in, for example, U.S. Pat. No. 3,709,841 or 3,875,096.

Other methods for the preparation and isolation of a sulphonated polysulphone, known in principle from the prior art, can be adapted, by analogy, to prepare the sulphonated polysulphones according to the invention. Such methods are described in, inter alia, the U.S. GOVERN. RES. DEV. REPORTS published by the NTIS (National Technical Information Service) and bearing the numbers PB 223,008, 230,690 and 232,461.

As already stated, the sulphonated polysulphone resin according to the invention can be in the acid form or in the form of a salt. The main salified forms are ammonium, alkali metal and alkaline earth metal salts. These salified forms can be prepared after isolating the sulphonated polysulphone in the acid form, by the action of a suitable alkaline agent, but it is also possible, advantageously, to prepare these salified forms without isolating the acid sulphonated polysulphones from the sulphonation reaction medium.

The sulphonated resin according to the present invention can be converted into shaped articles and, more particularly, into membranes of which they form an active constituent.

They can be in the form of simple membranes with ion exchange properties. These can be prepared in various ways, for example by hot pressing, calendering or casting a solution, followed by evaporation. These membranes are dense and are used especially as compartment-separating diaphragms in electrodialysers or in electrolysis or electrosynthesis apparatuses.

They can also be in the form of asymmetric or anisotropic membranes possessing (a) a thin layer which is either dense or has pores of small diameter, i.e., microporous, this layer playing the role of a semi-permeable membrane, and (b) a porous layer having pores of diameter greater than those of layer (a), this layer acting as a strengthening support. Such membranes can be prepared by casting a solution of the polymer according to this invention on a support and then coagulating the liquid film by immersion in a non-solvent for the polymer. Polar aprotic solvents are suitable solvents for the solution of the polymer. Dimethylformamide, dimethylacetamide, dimethylsulfoxide and N-methylpyrrolidone are especially useful. Ethers such as Tetrahydrofurane and dioxane may be added to the solution. Water, lower alcohols are useful non solvents for the coagulation. These non solvents may also content some salts, especially alkali metal and alkaline earth metal salts.

Again, they can be in the form of composite membranes in which the polymer of this invention is deposited in the form of a fine layer generally 0.1 to 10μ thick on a porous support (which can be an ultrafiltering membrane).

All these types of membranes can be screen-reinforced, the screen generally making up 20 to 80% by weight of the entire membrane. A screen is a strengthening support, for example a woven fabric, a non-woven fabric, a paper, or a grid or grating. Simple screen-reinforced membranes can be prepared by casting a solution of polymer on the screen and evaporating the solvent.

The various types of membranes mentioned above, especially the asymmetric membranes and the composite membranes, are, depending on the particular cases, useful in reverse osmosis or in ultrafiltration.

It is possible, by using them, to fractionate a variety of different solutions or suspensions. The following may be mentioned, by way of example: saline solutions such as sea water, brackish water, hard water, underground water, river water and spent water from industry; solutions in which the solute is an organic molecule or macromolecule, such as sugar solutions and solutions containing enzymes, proteins, nucleic acids and other heat-labile products; and solutions containing both salts and organic molecules such as liquid foodstuffs, sugared juices, fruit juices, meat juices and whey. All these solutions can also contain insoluble elements in suspension.

However, the main application of the polymers of the invention is the production of membranes for reverse osmosis. Processes involving fractionation by reverse osmosis are widely known, especially in relation to the apparatuses employing such membranes. Compared with the known membranes made of sulphonated polysulphones, the polymers according to the invention exhibit improved permeability.

The following Example further illustrates the present invention.

EXAMPLE 200.3 cm³ of 1,2-dichloro-ethane and 38 g (67.8 millimols) of a nonsulphonated polysulphone consisting of units of the formula (II), prepared by polycondensation of para-α,α'-bis-(para-hydroxyphenyl)-para-diisopropylbenzene and bis-(para-chlorophenyl)-sulphone in accordance with Example 1 of French Pat. No. 2,056,513 are introduced into a 1 liter glass flask equipped with a stirrer, a thermometer, a dropping funnel and an inert atmosphere (dry nitrogen) and immersed in a bath thermostatically set at 25° C. After the polysulphone has dissolved in the dichloroethane, a solution of 10.0175 g (86 millimols) of chlorosulphonic acid in 29.23 cm³ of 1,2-dichloro-ethane is run over 30 minutes into the reaction mixture. The reaction mixture is kept at 25° C for 1 hour. 35 cm³ of a solution of sodium hydroxide in methanol (concentration: 200 g per liter) are then added gradually over 45 minutes. The reaction mixture is decanted, the supernatant liquid layer is removed, and the sulphonated polysulphone which has precipitated is washed with twice 150 cm³ of dichloroethane. 110 cm³ of dimethylformamide are then added and this dissolves the sulphonated polysulphone; the remaining dichloroethane is removed at elevated temperature by bubbling nitrogen through, and then a further 50 cm³ of dimethylformamide are added and the whole is precipitated by means of 1 liter of water.

The sulphonated polysulphone is washed with 5 liters of water until the resistivity of the water from the last washing process is greater than 100,000 ohm. cm. The wet polymer is dried at 80° C for 48 hours under a pressure of 20 mm of mercury. 38 g of sulphonated polysulphone containing 1,090 milliequivalents of sulphonic acid groups per kg of resin are thus obtained; its specific viscosity, measured at 25° C in the form of a 2 g/l solution in dimethylformamide, is 0.182. Its substitution resistance, measured as indicated in U.S. Pat. No. 3,709,841, is equal to 8 ohm. cm².

A sulphonated polysulphone film is prepared by dissolving 5 g of this polymer in 25 cm³ of dimethylformamide, and then casting this solution on a plate of dimensions 25 cm × 12.5 cm, followed by drying for 10 hours at 60° C under a pressure of 20 mm of mercury. A film is thus obtained which possesses a thickness of 0.17 mm and has a bursting pressure of 3 bars (deflection at bursting 6.5 mm), these measurements too being carried out as indicated in U.S. Pat. No. 3,709,841. A sulphonated polysulphone membrane of thickness 20μ (dense structure like that obtained by evaporation of solvents) was prepared in the same way; this membrane was used to treat an aqueous solution of NaCl, of concentration 5 g/l, by reverse osmosis under 80 bars. A degree of rejection of salt of 99.5% is observed, the flow rate being 17.5 l/day.m², corresponding, if this flow rate is related to unit membrane thickness, to 350 l.μ/day.m². Under similar conditions, the known sulphonated polyaryl-ether-sulphone, derived from units of the formula (III), possesses a permeability per unit thickness of 150 l.μ/day.m² for a membrane with an equivalent degree of rejection.

I claim:

1. A sulphonated polyaryl-ether-sulphone resin which consists essentially of a plurality of units of the formula:

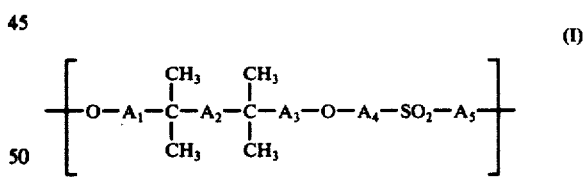

and, optionally, a plurality of units of the formula:

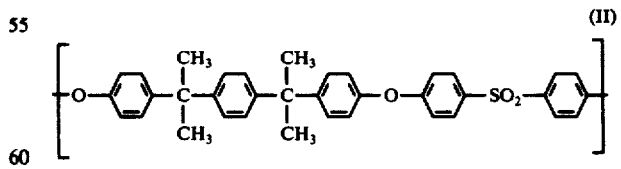

in which $A_1$, $A_2$, $A_3$, $A_4$ and $A_5$ each represents a phenylene radical at least one of which is substituted by a sulpho ($-SO_3H$) or salified sulpho radical, the relative proportions of units of formula (I) and (II) and the degree of substitution by sulpho radicals being such that the number of sulpho groups is from about 0.1 to about 5 milliequivalents per gram of dry resin.

2. A sulphonated polysulphone according to claim 1 which contains from about 0.6 to about 2 milliequivalents of sulpho radicals per gram of dry resin.

3. A sulphonated polysulphone according to claim 1 which is in the form of the free acid.

4. A sulphonated polysulphone according to claim 1 which is in the form of an ammonium or alkali metal or alkaline earth metal salt.

5. A sulphonated polysulphone according to claim 1 having a total number of units of formula (I) and (II) from 18 to 30.

6. A sulphonated polysulphone according to claim 1 which is in the form of a membrane.

7. A sulphonated polysulphone according to claim 6 which is in the form of an anisotropic membrane possessing a) a thin dense or micro-porous layer and b) a relatively thick layer which is more porous than layer a).

8. A sulphonated polysulphone according to claim 6 which is in the form of a composite membrane, the resin being in the form of a thin dense or microporous layer deposited on a porous support.

* * * * *